United States Patent
Dutt et al.

[19]

[11] Patent Number: 6,086,282

[45] Date of Patent: Jul. 11, 2000

[54] COUPLING MECHANISM WITH LOCKING AND TORQUE LIMITING FEATURES

[75] Inventors: Kevin Charles Dutt, Southborough, Mass.; Raymond Sydney Schwartz, Atkinson, N.H.; Stuart Joesph MacNeill, Kittery, Me.

[73] Assignee: The Whitaker Corporation, Wilmington, Del.

[21] Appl. No.: 09/022,606

[22] Filed: Feb. 12, 1998

[51] Int. Cl.[7] .................................... F16D 7/02
[52] U.S. Cl. .................. 403/41; 403/409.1; 403/DIG. 3; 464/39; 464/30; 192/56.56; 411/1; 411/6
[58] Field of Search .................. 464/30, 37, 38, 464/39; 192/56.61, 56.6, 56.53, 56.56; 403/41, 409.1, DIG. 3; 411/7, 6, 1

[56] References Cited

U.S. PATENT DOCUMENTS

| | | | |
|---|---|---|---|
| 1,911,507 | 5/1933 | Hitchcock | 464/39 |
| 2,174,342 | 9/1939 | Greulich | 464/39 |
| 3,551,882 | 12/1970 | O'Keffe . | |
| 3,596,446 | 8/1971 | Bryan | 464/39 |
| 3,960,039 | 6/1976 | Nash et al. | 464/39 |
| 4,062,203 | 12/1977 | Leonard et al. | 464/38 |
| 5,074,703 | 12/1991 | Dawson | 464/39 |

*Primary Examiner*—Terry Lee Melius
*Assistant Examiner*—Kenneth Thompson

[57] ABSTRACT

A coupling mechanism (1) has a threaded body (12) adapted to establish a threaded coupling when rotated, a housing (2) being rotatable by the application of torque thereto, a thrust member (6) coupling the threaded body (12) and the housing (2) for rotation together until a torque limit is attained, and the thrust member (6) decoupling from the threaded body (12) by displacement of the thrust member (6) against frictional resistance of peaked ridges (16) and a bias by a resilient spring (5).

8 Claims, 5 Drawing Sheets

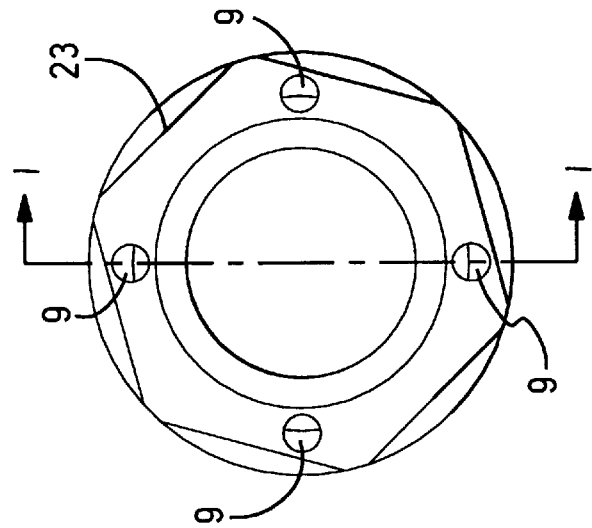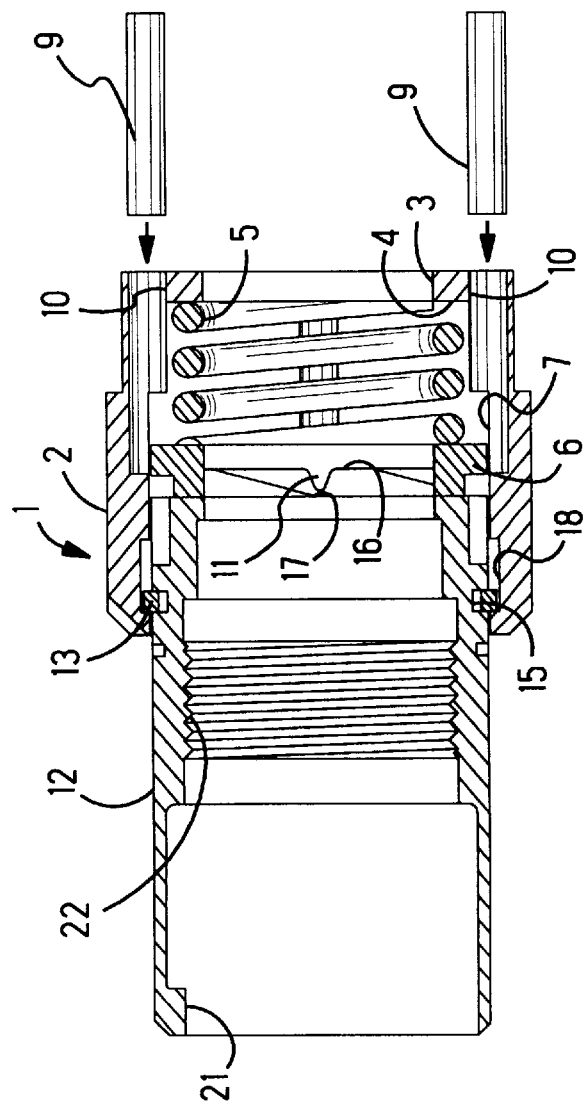

COUPLING MECHANISM WITH LOCKING AND TORQUE LIMITING FEATURES

FIELD OF THE INVENTION

The invention relates to a coupling mechanism having a threaded portion for threadably advancing on an externally threaded member, and, more particularly, to a coupling mechanism that is self locking and has a torque limiting feature.

BACKGROUND OF THE INVENTION

A known coupling nut is in the form of an internally threaded ring that is adapted to be threadably advanced concentrically over an externally threaded member to establish a coupled connection. For example, U.S. Pat. No. 3,551,882 discloses a known coaxial connector having a known coupling nut that is threadably advanced over another, mating electrical connector.

Rotating the known coupling nut by a tool, for example, a wrench having a torque limiting feature, will threadably advance the coupling nut until resistance to farther rotation meets a torque limit set by the tool.

The torque limiting feature on the tool enlarges the tool, which results in the tool being too large to fit over a coupling nut that is located in a confined space.

A desired torque limiting feature on the coupling nut would allow the coupling nut to receive a smaller tool, meaning a tool without a torque limiting feature.

SUMMARY OF THE INVENTION

According to the invention, a threaded coupling mechanism has a torque limiting feature providing a limit to the torque that can be applied to rotate the coupling mechanism so as to rotate and threadably advance the coupling mechanism.

An embodiment of the invention will now be described, by way of example, with further reference to the accompanying drawings, according to which:

DESCRIPTION OF THE DRAWINGS

FIG. 1 is a section view taken along the line 2—2 of FIG. 2, and further illustrating pins separated from a remainder of a coupling mechanism;

FIG. 2 is an end view of a mating end of a coupling mechanism having a torque limiting feature;

DETAILED DESCRIPTION

Figure 8:
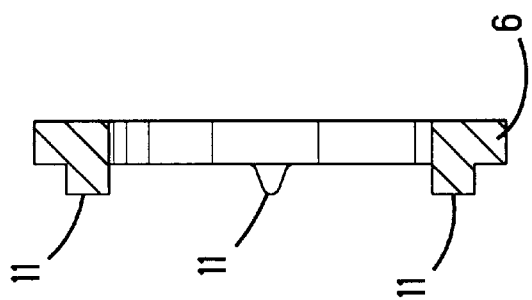
FIG. 8 is section view taken along the line 8-8 of FIG. 7.
Figure 9:
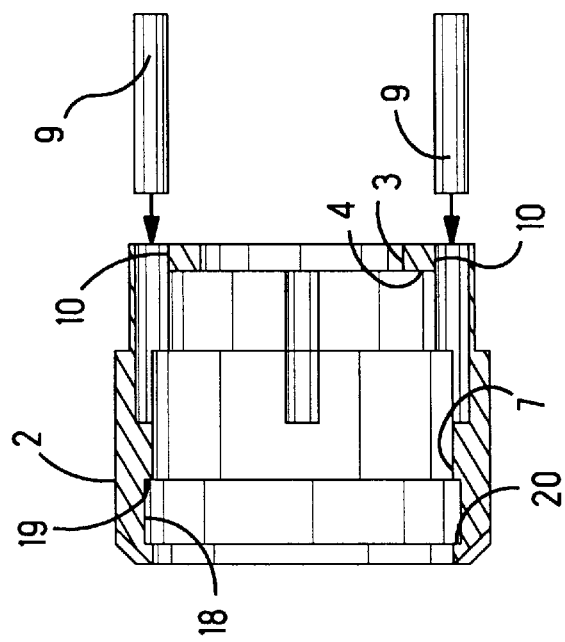
FIG. 9 is a section view taken along the line 9-9 of FIG. 10.
Figure 11:
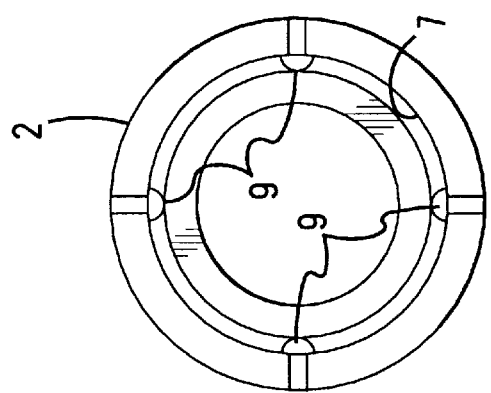
FIG. 11 is an end view of a rear of the housing as shown in FIG. 10.

With reference to FIGS. 1 and 9, a coupling mechanism 1 has a housing 2 with an open rear end 3, and a front facing, circumferential shoulder 4 in an interior of the housing 2, against which registers a tension applying, hollow coil spring 5. With reference to FIGS. 1 and 8, the spring 5 engages and resiliently biases a thrust member 6, for example, a thrust ring, that reciprocates longitudinally, front to rear, in an enlarged, stepped diameter portion 7 of the interior of the coupling mechanism 1.

Figure 7:
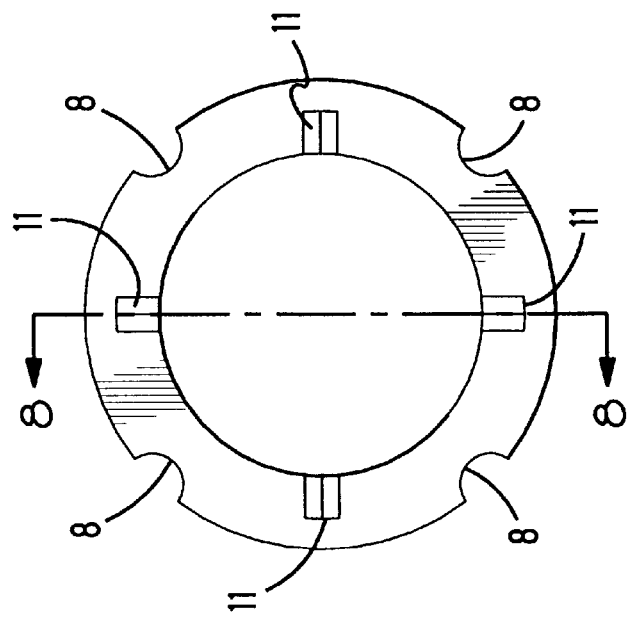
FIG. 7 is an end view of a rear of a thrust ring that is a portion of the coupling mechanism as shown in FIG. 1.
Figure 10:
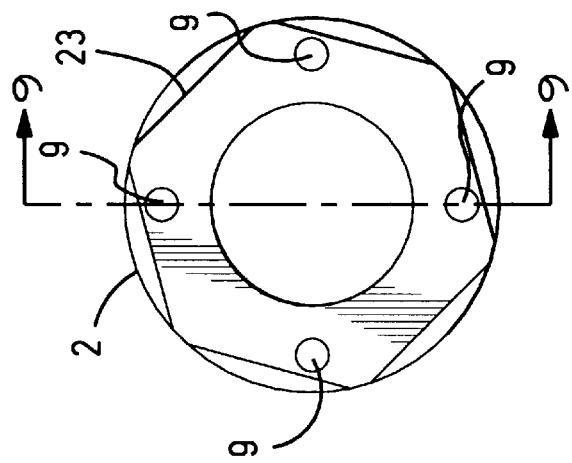
FIG. 10 is an end view of a front end of a housing that is a portion of the coupling mechanism as shown in FIG. 1.

With reference to FIGS. 1 and 7, the thrust member 6 has a series of longitudinal passages 8 in its outer periphery. The thrust member 6 further has a series of front facing, projecting biasing fingers 11 that are circumferentially spaced along a front of the thrust member 6. Corresponding longitudinal pins 9 register along the corresponding passages 8 to restrain the thrust member 6 from rotation relative to the housing 2, while allowing reciprocation of the thrust member 6 relative to and along the pins 9. As shown in FIGS. 1 and 2, the pins 9 are mounted in corresponding sockets 10 in a rear end 3 of the housing 2.

Figure 4:
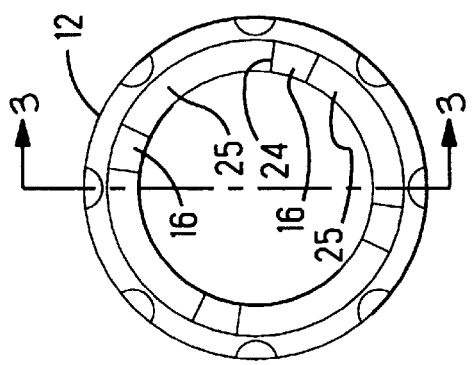
FIG. 4 is an end view of a threaded body that is a portion of the coupling mechanism as shown in FIG. 1.
Figure 6:
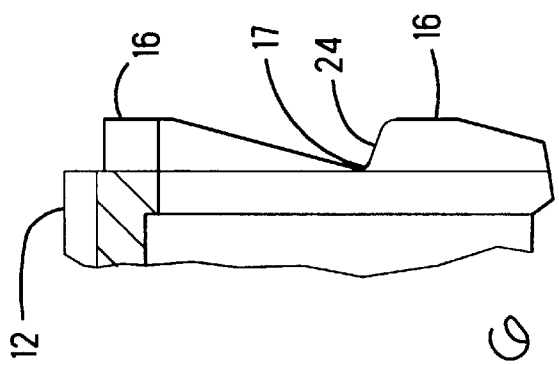
FIG. 6 is a fragmentary enlarged view of a portion of the threaded body as shown in FIG. 3.
Figure 3:
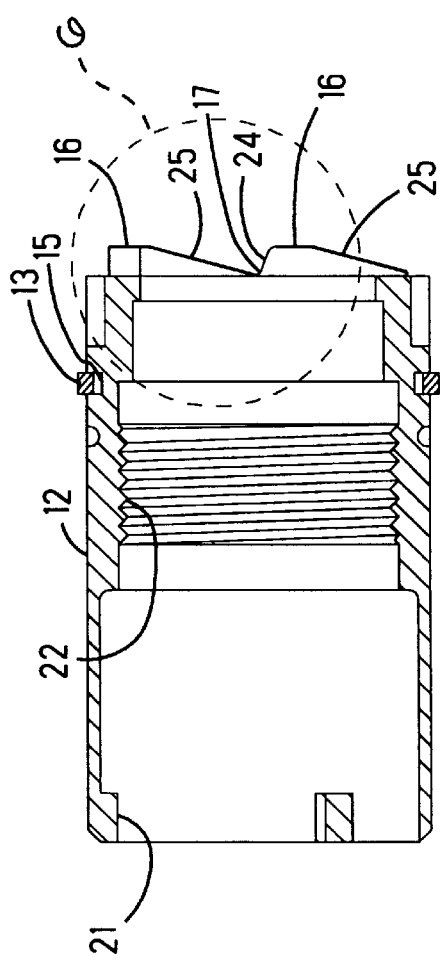
FIG. 3 is section view taken along the line 3—3 of FIG. 4.
Figure 5:
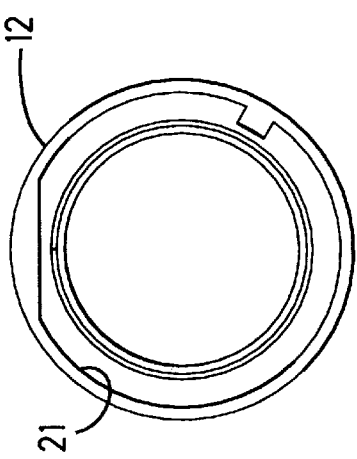
FIG. 5 is an end view of a rear of the threaded body as shown in FIG. 3.
Figure 12:
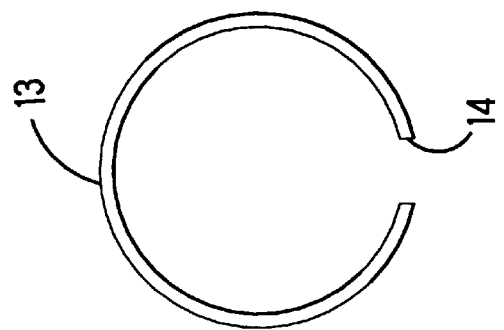
FIG. 12 is a snap ring that forms a portion of the coupling mechanism as shown in FIG. 1.

With reference to FIGS. 1 and 3, the coupling mechanism 1 further has a cylindrical threaded body 12. A resilient snap ring 13, FIG. 12, has an open seam 14 permitting resilient contraction of the snap ring 13 for a snap fit in an exterior circumferential groove 15 in the threaded body 12. With reference to FIGS. 3 and 6, a rear end of the threaded body 12 has a series of sloped, peaked ridges 16 spaced radially from a central axis of the threaded body 12. The ridges 16 face rearward.

Figure 13:
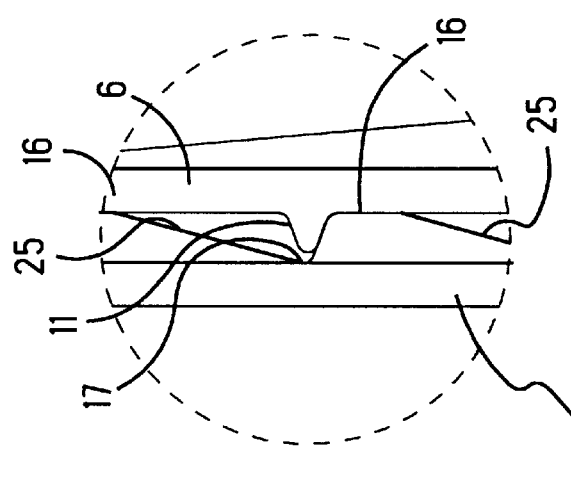
FIG. 13 is an enlarged fragmentary view of a portion of the coupling mechanism as shown in FIG. 1.

Assembly of the threaded body 12 and the housing 2 will now be described with reference to FIGS. 1 and 13. The rear end of the threaded body 12 is assembled into a front open end of the housing 2, such that the fingers 11 on the thrust member 6 register in corresponding recesses 17 between the sloped ridges 16. The spring 5 resiliently biases the thrust member 6 toward the threaded body 12 to resist movement of the fingers 11 from the recesses 17. The thrust member 6 couples the threaded body 12 for rotation together with the housing 2.

The housing 2 has an undercut, enlarged internal diameter portion 18 that is snap fit over the snap ring 13. The snap ring 13 retains the housing 2 rotatably on the threaded body 12. Further, the housing 2 is slidable relative to the threaded body 12. A front facing shoulder 19 and a rear facing shoulder 20 define the limits of sliding displacement.

A hollow interior of the body 12 provides an open front mating end 21 and an internally threaded portion 22 to be threadably coupled to an externally threaded member, for example, which is on another, mating coaxial connector, not shown. Clockwise rotation of the housing 2 is provided, for example, by a wrench tool, not shown, applying torque to a hexagonal section 23 on the housing 2. Due to the applied torque, the fingers 11 on the thrust member 6 thrust against steep slopes 24 on the ridges 16, on the threaded body 12, to couple the threaded body 12 and the housing 2 for rotation to threadably advance the threaded body 12 to establish a threaded coupling.

Figure 14:
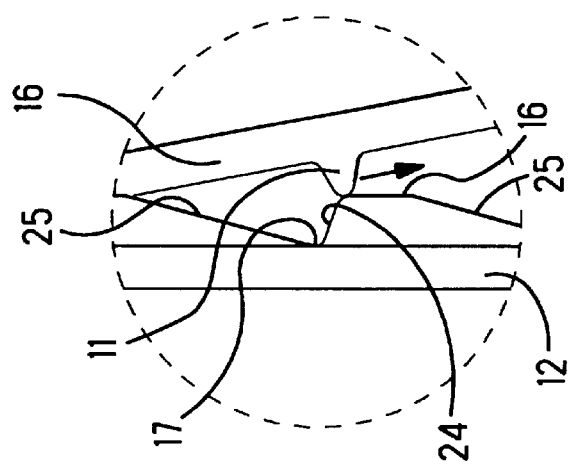
FIG. 14 is a view similar to FIG. 13 showing operation of a torque limiting feature.

Threaded advancement of the threaded body 12 continues until a torque limit is attained. When the torque limit is attained, the thrust member 6 slips against the threaded body 12. The fingers 11 traverse over the peaked ridges 16, as shown in FIG. 14, which displaces the thrust member 6 against the bias of the spring 5, to compress the coil spring 5, and to decouple the thrust member 6 from the threaded body 12. The application of further torque to the housing 2 will rotate the thrust member 6 relative to the threaded body 12. The coupling mechanism 1 is said to be torque limiting, by having a torque limiting feature, as described above. The torque limit is set by the bias of the spring 5 against the thrust member 6, and by frictional resistance to slipping or, alternately stated, the frictional resistance to the fingers 11 traversing over the steep slopes 24 of the threaded body 12.

A self locking feature that prevents threaded uncoupling of the coupling mechanism 1 will now be described with reference to FIG. 13. The application of torque to the housing 2 that causes reverse rotation of the housing 2 will cause the thrust member 6 to decouple from the threaded body 12 to prevent transfer of reverse rotation to the threaded body 12. Upon reverse rotation of the housing 2 and the thrust member 6, the fingers 11 on the thrust member 6 traverse over shallow slopes 25 of the ridges 16, to displace the thrust member 6 against the bias of the coil spring 5, and decouple the thrust member 6 from the threaded body 12. Because the shallow slopes 25 provide relatively low frictional resistance to traverse of the thrust member 6 over the peaked ridges 16, the thrust member 6 decouples from the threaded body 12 at a relatively low magnitude of torque that is applied to the housing 2 to cause reverse rotation of the thrust member 6 and the housing 2. Thus, the threaded body 12 will remain threadably coupled at the torque limit. The coupling mechanism 1 provides a self-locking feature that prevents unintended reduction of the torque limit that has been applied to a threaded coupling.

Figure 15:
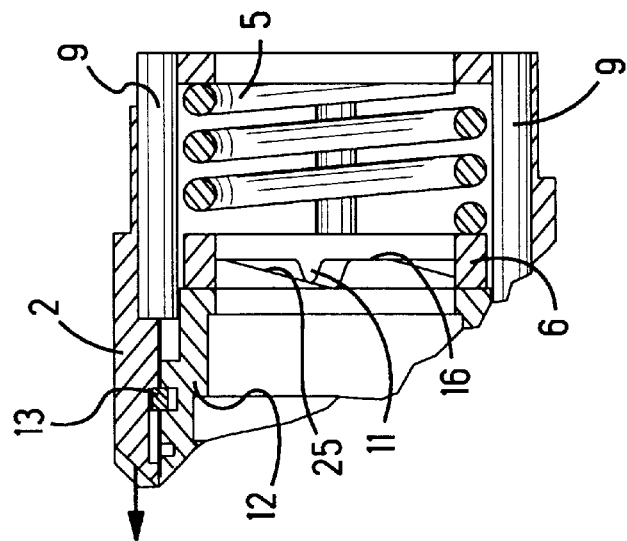
FIG. 15 is a fragmentary section view of a portion of the coupling mechanism as shown in FIG. 1, and further showing compression of a coil spring by displacement of a housing of the coupling mechanism as shown in FIG. 1.

When reverse rotation of the threaded body 12 is desired, the housing 2 is slidable to its limit position shown in FIG. 15, to compress the coil spring 5 and bias the thrust member 6 to forcibly couple with the threaded body 12. The fingers 11 on the biased thrust member 6 remain registered in the recesses 17. The fingers 11 impinge the slopes 25 and are retained against the slopes 25 by the spring bias, as torque is applied to cause reverse rotation of the housing 2. The thrust member 6 couples the threaded body 12 for reverse rotation together with the housing 2.

Although a preferred embodiment has been described, other embodiments and modifications are intended to be covered by the spirit and scope of the appended claims.

What is claimed is:

1. A coupling mechanism comprising: a threaded body adapted to establish a threaded coupling when rotated, a housing mounted rotatably on the threaded body, the housing being rotatable by the application of torque thereto, a thrust member in the housing, a compressible spring in the housing engaging and biasing the thrust member into registration in recesses in the threaded body to couple the threaded body with the housing for rotation together until attaining a torque limit, and the torque limit being attained by displacement of the thrust member out of said registration and toward and against the spring to compress the spring to allow slipping of the thrust member against the threaded body.

2. A coupling mechanism as recited in claim 1 wherein, fingers on the thrust member register in recesses between sloped ridges on the threaded member, and the fingers frictionally traverse over the sloped ridges toward and against the coil spring to compress the coil spring and limit rotation of the threaded member during further rotation of the housing.

3. A coupling mechanism as recited in claim 2 wherein, the sloped ridges have steeply sloped portions, the housing being rotatable forwardly to traverse the fingers frictionally over the steeply sloped portions to compress the coil spring to cease farther rotation of the threaded member in response to rotation of the housing.

4. A coupling mechanism as recited in claim 3 wherein, the sloped ridges have shallow slopes, and the housing being rotatable in a reverse direction to frictionally traverse the fingers over the shallow slopes and initiate compression of the coil spring by a force substantially lower than that required at the torque limit.

5. A coupling mechanism as recited in claim 1 wherein, the thrust member is restrained from rotation relative to the housing.

6. A coupling mechanism comprising: a threaded body adapted to establish a threaded coupling when rotated, a housing mounted rotatably on the threaded body, the housing being rotatable by the application of torque thereto, a compressible spring in the housing engaging and biasing a thrust member into coupled registration with the threaded body, the thrust member coupling the threaded body and the housing for rotation together until a torque limit is attained, and the torque limit being attained by displacement of the thrust member against the bias of the spring to decouple the thrust member from the threaded body.

7. A coupling mechanism as recited in claim 6 wherein, the housing is slidably mounted on the threaded body to compress the spring to increase the bias of the thrust member into coupled registration with the threaded body during reverse rotation of the housing.

8. A coupling mechanism as recited in claim 6 wherein, the thrust member is slidable relative to the threaded body upon reverse rotation of the thrust member and the housing.

* * * * *